United States Patent Office 3,792,058
Patented Feb. 12, 1974

3,792,058
2-(p-ACETAMINOPHENOXY)-TETRAHYDRO-
PYRAN
Arnold John Repta, Lawrence, Kans., assignor to Warner-
Lambert Company, Morris Plains, N.J.
No Drawing. Filed Aug. 11, 1972, Ser. No. 279,900
Int. Cl. C07d 7/04
U.S. Cl. 260—345.7   1 Claim

ABSTRACT OF THE DISCLOSURE

A relatively tasteless form of p-acetaminophen which is rapidly released under acid conditions in the gastrointestinal tract is obtained by forming an acylal with tetrahydropyran.

Among the known analgesic and antipyretic drugs, one which is in wide use today in many proprietary remedies is p-acetaminophen (N-acetyl-p-aminophenol). The antipyretic and analgesic activity of this drug has long been recognized and as a consequence it has been in use for many years. The usual oral dosage for adults is a tablet of 0.3 to 0.6 gram every four hours with the total daily dosage being not more than about 2.60 grams. This total may be exceeded in some cases of rheumatoid arthritis. An elixir, a solution and a syrup of p-acetaminophen are also prescribed. One of the major drawbacks in administering this drug is its unpleasant taste. Where the dosage form desired is a chewable tablet containing p-acetaminophen it is essential that this unpleasant taste be overcome.

I have now found that by converting p-acetaminophen into the following acylal, i.e., 2-(p-acetaminophenoxy)-tetrahydropyran,

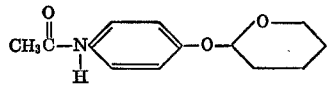

the compound obtained is a substantially tasteless form of p-acetaminophen which can be freely administered without experiencing the usual unpleasant taste. While this novel acylal is tasteless under the neutral pH normally present in the mouth, this compound is readily hydrolyzed under the acid conditions prevailing in the gastro-intestinal tract. Thus, at body temperature of 37° C. and at a pH of 3 in only 5 minutes half of the acylal is hydrolyzed to free p-acetaminophen.

In order further to illustrate this invention the following example is given.

EXAMPLE

A suspension of 30 grams of p-acetaminophen in 375 ml. of dihydropyran and 250 ml. of methylene chloride saturated with gaseous HCl is introduced into a reaction vessel. While the latter is sealed the suspension is magnetically stirred for 12 hours or until the suspension turns into a clear, yellow solution.

The solution obtained is then concentrated under reduced pressure on a rotary evaporator. The solid precipitate formed is filtered off and the remaining solution further concentrated by evaporation. The solid formed is again separated and the concentration step then repeated several times over in order to increase the yield. After being thoroughly dried at 40° C. in a vacuum oven the combined solid product is then twice recrystallized from warm benzene and again dried at 40° C. The yellow crystalline product obtained melts at 119°–121° C. The yield is 50% of theory.

*Elemental analysis.*—Found (percent): C, 66.6; H, 7.5; N, 6.2. Theoretical (percent): C, 66.4; H, 7.5; N, 6.0.

The 2-(p-acetaminophenoxy)-tetrahydropyran thus obtained can be readily formulated into a tasteless chewable tablet with one or more pharmaceutical excipients such as starch, mannitol, sucrose and/or sorbitol with the aid of lubricants such as stearic acid and talc to give tablets containing the desired unit dosage of 0.3 to 0.6 gram of p-acetaminophen, as brought out above.

I claim:
1. 2-(p-acetaminophenoxy)-tetrahydropyran.

References Cited

Diner, U. E.: C.A., vol. 67, 1967, p. 116350b.

HENRY R. JILES, Primary Examiner
M. A. M. CROWDER, Assistant Examiner

U.S. Cl. X.R.
424—283